US010611401B2

(12) United States Patent
StHilaire et al.

(10) Patent No.: US 10,611,401 B2
(45) Date of Patent: Apr. 7, 2020

(54) POWER STEERING APPARATUS

(71) Applicant: TRW Automotive U.S. LLC, Livonia, MI (US)

(72) Inventors: Samuel A. StHilaire, West Lafayette, IN (US); Qinghe Li, San Francisco, CA (US); Kevin M. Tilton, Lafayette, IN (US)

(73) Assignee: ZF ACTIVE SAFETY AND ELECTRONICS U.S. LLC, Livonia, MI (US)

( * ) Notice: Subject to any disclaimer, the term of this patent is extended or adjusted under 35 U.S.C. 154(b) by 494 days.

(21) Appl. No.: 15/596,097

(22) Filed: May 16, 2017

(65) Prior Publication Data
US 2018/0334185 A1 Nov. 22, 2018

(51) Int. Cl.
*B62D 5/06* (2006.01)
*B62D 5/065* (2006.01)

(52) U.S. Cl.
CPC ............. *B62D 5/063* (2013.01); *B62D 5/065* (2013.01)

(58) Field of Classification Search
CPC .......... B62D 5/063; B62D 5/065; B62D 5/30; B62D 5/32
USPC ....................................................... 180/417
See application file for complete search history.

(56) References Cited

U.S. PATENT DOCUMENTS

| 4,517,800 A * | 5/1985 | Karakama | ................ | B62D 5/32 |
| | | | | 180/403 |
| 4,629,025 A | 12/1986 | Brasier et al. | | |
| 7,225,894 B2 | 6/2007 | Broughton | | |
| 7,510,044 B2 | 3/2009 | Williams | | |
| 8,479,870 B2 | 7/2013 | Yoda et al. | | |
| 9,315,208 B2 | 4/2016 | Williams | | |
| 2008/0006469 A1* | 1/2008 | Sasaki | .................. | B62D 5/0481 |
| | | | | 180/428 |
| 2008/0277186 A1* | 11/2008 | Williams | ............... | B62D 5/063 |
| | | | | 180/403 |
| 2008/0277187 A1* | 11/2008 | Williams | ............... | B62D 5/063 |
| | | | | 180/422 |
| 2009/0200358 A1 | 8/2009 | Yamashita et al. | | |
| 2011/0313621 A1* | 12/2011 | Williams | ............... | B62D 5/063 |
| | | | | 701/41 |
| 2013/0186704 A1 | 7/2013 | Noah | | |
| 2014/0069734 A1 | 3/2014 | Williams | | |
| 2015/0183459 A1* | 7/2015 | Williams | ............... | B62D 5/065 |
| | | | | 180/432 |
| 2018/0334185 A1* | 11/2018 | StHilaire | ................ | B62D 5/075 |

* cited by examiner

*Primary Examiner* — Kevin Hurley
*Assistant Examiner* — Conan D Duda
(74) *Attorney, Agent, or Firm* — Tarolli, Sundheim, Covell & Tummino LLP

(57) ABSTRACT

An apparatus for use in turning steerable vehicle wheels includes first and second pumps driven by a vehicle engine to supply fluid under pressure to a power steering motor assembly connected with the vehicle wheels. The first pump is sized to provide a fluid flow required by the power steering motor assembly to effect a first vehicle maneuver when the engine speed is at or above a first predetermined speed. A valve directs fluid flow from the second pump to the power steering motor assembly, which when combined with the fluid flow of the first pump is sufficient for the power steering assembly to effect a second vehicle maneuver when the engine speed is at or above the first predetermined speed. A greater fluid flow is required to effect the second vehicle maneuver than to effect the first vehicle maneuver.

21 Claims, 5 Drawing Sheets

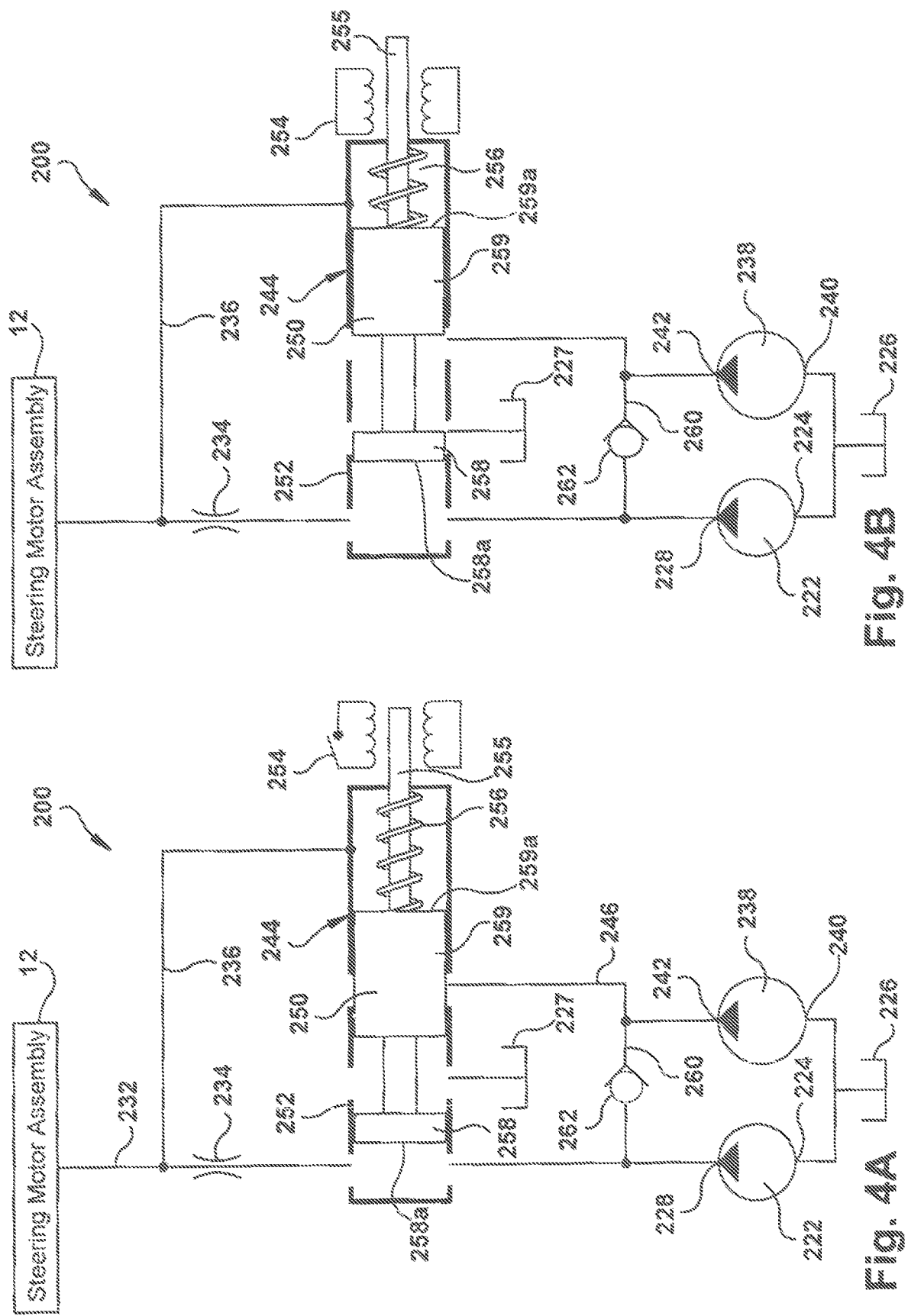

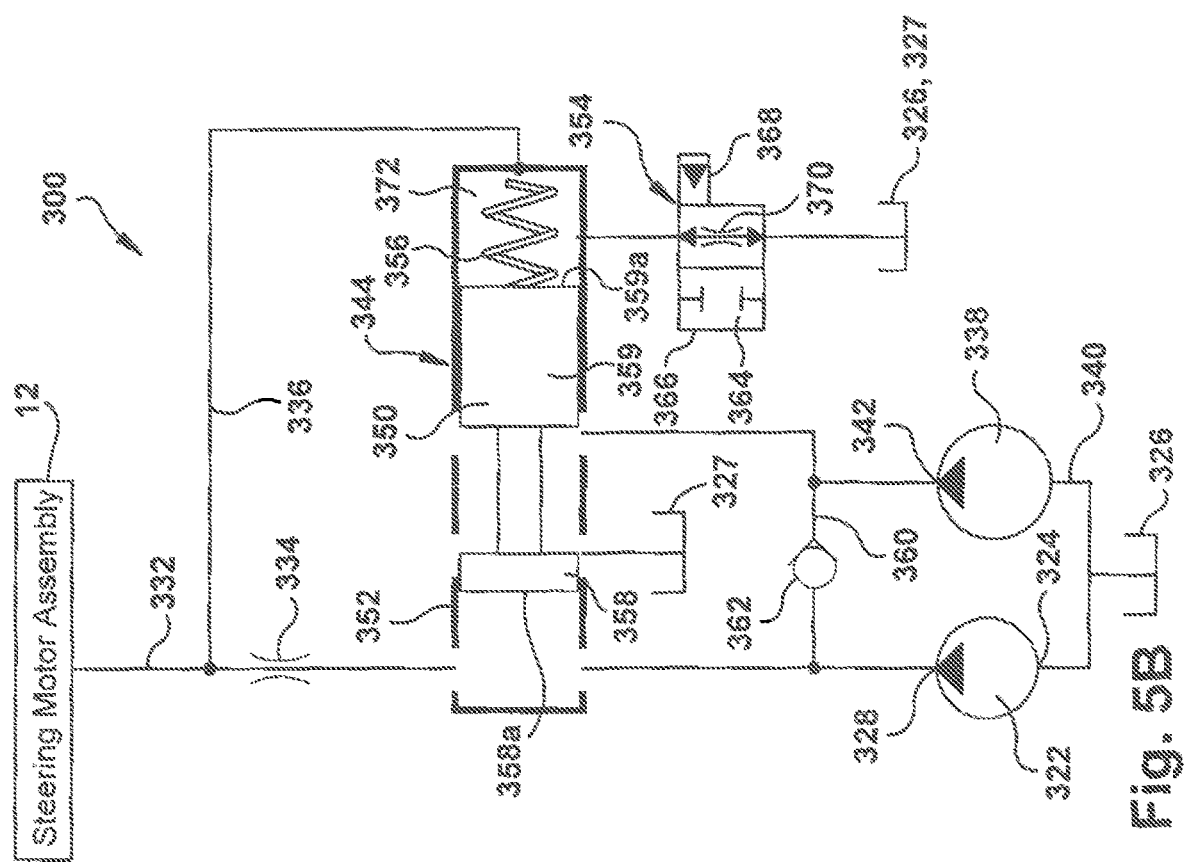
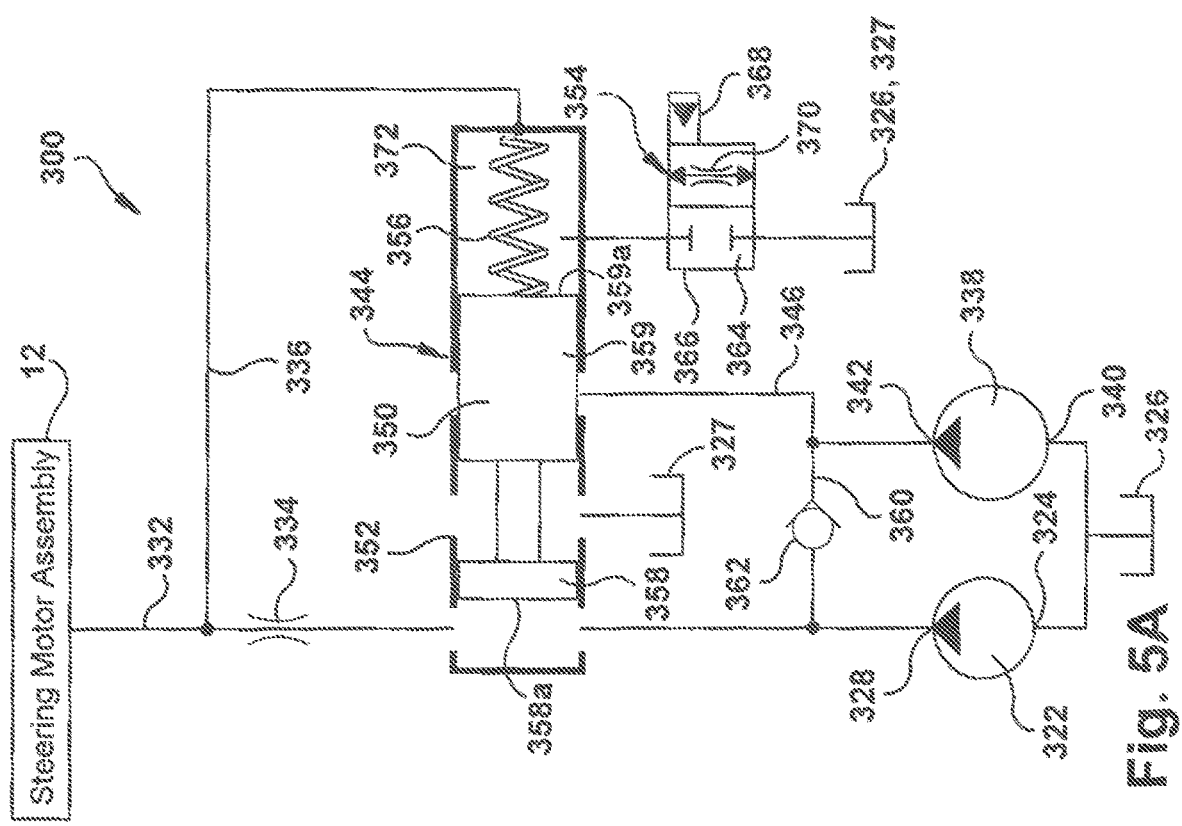

POWER STEERING APPARATUS

BACKGROUND OF THE INVENTION

The present invention is directed to an apparatus for use in turning steerable vehicle wheels.

In a known power steering system, an engine driven pump provides a fixed volume of fluid output per revolution during operation of the pump. Therefore, the rate of flow of fluid from the engine driven pump is proportional to engine speed. The pump in this known power steering system is sized to provide an acceptable rate of fluid flow when the engine is idling and thus provides higher rates of flow at higher engine speeds.

A known power steering motor assembly has an open center valve, which requires a constant rate of fluid flow independently of engine speed. In order to obtain a constant rate of fluid flow independently of engine speed, a known power steering system utilizes a flow control valve having a spring loaded valve spool, which is moved to maintain a constant pressure drop across a control orifice.

SUMMARY OF THE INVENTION

In a representative embodiment of the present invention, an apparatus for use in turning steerable wheels of a vehicle comprises a power steering motor assembly connected with the steerable vehicle wheels. The power steering motor assembly includes a steering control valve and a power steering motor. The steering control valve moves in response to rotation of an input shaft to control fluid flow to and from a first chamber and a second chamber of the power steering motor so as to move a piston of the power steering motor. The steering control valve in response to rotation of the input shaft directs fluid from a fluid inlet of the steering control valve to one of the first and second chambers and away from another of the first and second chambers. A first pump is connected in fluid communication with the fluid inlet of the steering control valve and is driven by an engine of the vehicle, during operation of the engine, to supply fluid under pressure to the fluid inlet of the steering control valve. The first pump is sized so as to provide a fluid flow required by the power steering motor assembly to effect a first vehicle maneuver when the engine is operating at a speed at or above a first predetermined speed. A second pump is connected in fluid communication with the fluid inlet of the steering control valve to supply fluid under pressure to the fluid inlet. The second pump is sized so as to provide a fluid flow that when combined with the fluid flow of the first pump results in a fluid flow to the power steering motor assembly sufficient for the power steering motor assembly to effect a second vehicle maneuver when the engine speed is at or above the first predetermined speed. A first valve is connected in fluid communication with the fluid inlet of the steering control valve and with the second pump. The first valve is operable to direct an operating flow of fluid from the second pump to the fluid inlet of the steering control valve. The first valve is also operable to direct a return flow of fluid from the second pump to a reservoir. A control device includes an electrically actuated mechanism that when actuated moves a member from a first position to a second position to modify the operating flow of fluid and/or the return flow of fluid that would otherwise be directed by the first valve. The control device is operable such that the operating flow of fluid when modified by the control device and combined with the fluid flow of the first pump results in a combined fluid flow to the power steering motor assembly sufficient for the power steering motor assembly to effect the second vehicle maneuver when the engine speed is at or above the first predetermined speed. The power steering motor assembly requires a greater fluid flow at any given engine speed at or above the first predetermined speed to effect the second vehicle maneuver than to effect the first vehicle maneuver.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 4A is a schematic illustration of a second embodiment of a power steering apparatus in accordance with the present invention in a first mode of operation;

FIG. 4B is a schematic illustration of the power steering apparatus of FIG. 4A in a second mode of operation;

FIG. 5A is a schematic illustration of a third embodiment of a power steering apparatus in accordance with the present invention in a first mode of operation; and FIG. 5B is a schematic illustration of the power steering apparatus of FIG. 5A in a second mode of operation.

DESCRIPTION OF EMBODIMENTS

Figure 1:
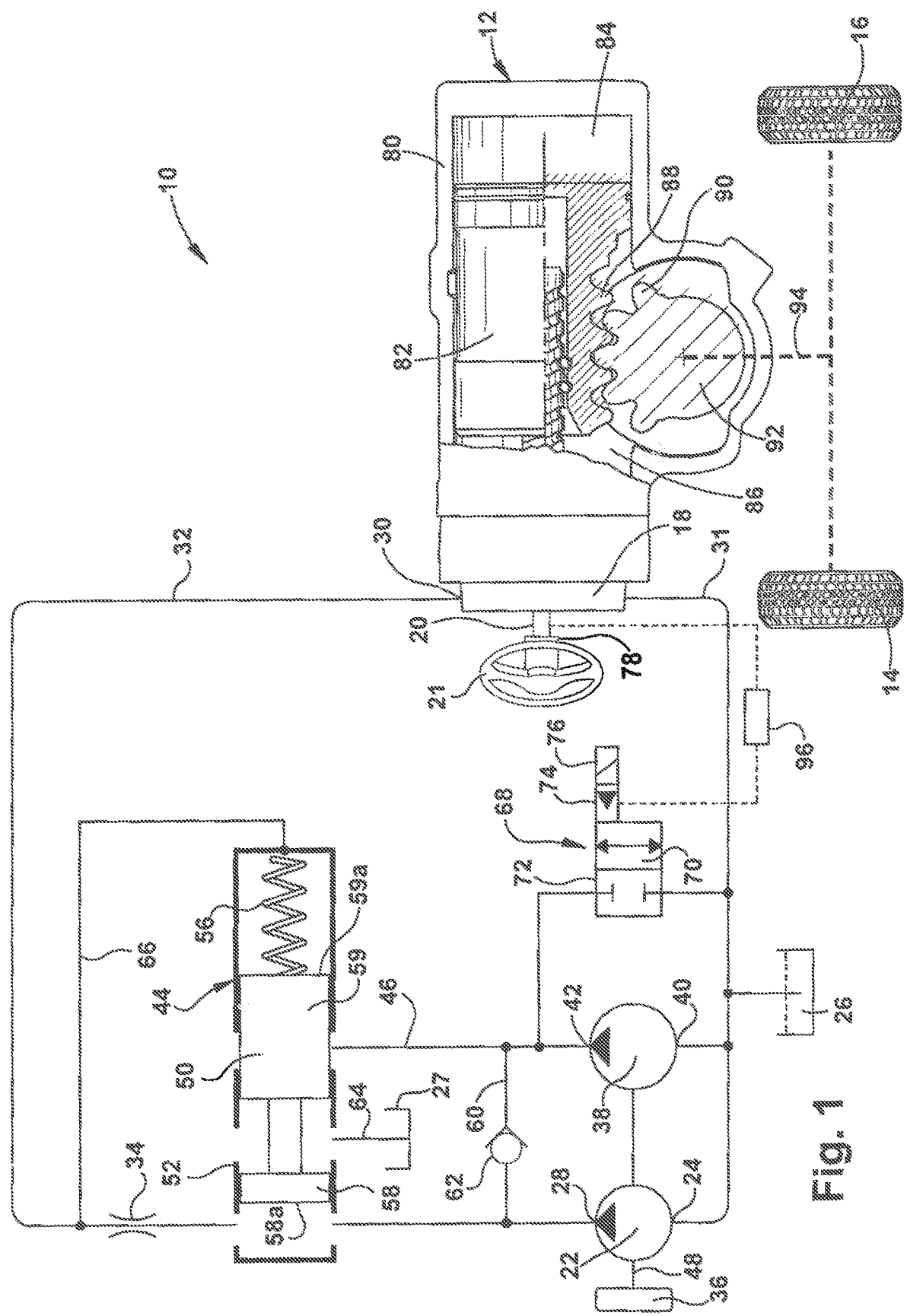
FIG. 1 is a schematic illustration of a first embodiment of a power steering apparatus in accordance with the present invention.

FIG. 1 illustrates a hydraulically assisted steering apparatus or system 10 for a vehicle (not shown), in accordance with an example of the present invention. The hydraulically assisted steering system 10 includes a hydraulic power steering motor assembly 12, which is operatively connected with steerable vehicle wheels 14 and 16. A steering control valve 18 is operatively connected with the power steering motor assembly 12. The steering control valve 18 has an input shaft 20, which is operatively connected with a manually rotatable vehicle steering wheel 21. The steering control valve 18 may be an open center control valve.

A first pump 22 has a fluid input 24 connected in fluid communication with a fluid reservoir 26. A fluid output 28 of the first pump 22 is connected in fluid communication with a fluid inlet 30 of the steering control valve 18 by a fluid supply conduit 32. The first pump 22 is continuously driven by an engine 36 of the vehicle, during operation of the engine. Therefore, during operation of the engine 36, the first pump 22 continuously supplies fluid under pressure to the power steering motor assembly 12.

A second pump 38 has a fluid input 40 connected in fluid communication with the fluid reservoir 26. A fluid output 42 of the second pump 38 is connected in fluid communication with a valve 44 by a conduit 46. The second pump 38 is continuously driven by the engine 36 of the vehicle, during operation of the engine. The first and second pumps 22 and 38 may be mounted on the same output shaft 48 of the engine 36. The first and second pumps 22 and 38 may thus be driven at the same speed, which is the speed of the engine 36. The pumping volume or capacity of the second pump 38 may be larger than the pumping volume or capacity of the first pump 22. During rotation of the output shaft 48 of the engine 36, the second pump 38 may thus pump or discharge more fluid than the first pump 22 even though the output shaft is turning at a constant speed.

The valve 44 controls flow from the fluid output 42 of the second pump 38 to the steering control valve 18 and the power steering motor assembly 12 and to the fluid reservoir 26, which may include a bypass tank 27. In the valve 44, a valve spool 50 moves in one direction in a valve housing 52 of the valve 44 under the influence of a fluid pressure differential. The valve spool 50 moves in an opposite direction in the valve housing 52 under the influence of a biasing return spring 56. In a first position of the valve spool 50, as shown in FIG. 1, the valve 44 blocks fluid flow from the second pump 38 to the bypass tank 27 of the fluid reservoir 26. In a second position of the valve spool 50, which is not shown, the valve 44 directs fluid from the second pump 38 to the bypass tank 27 of the fluid reservoir 28 through a conduit 64.

In the first position of the valve spool 50, therefore, the valve 44 directs fluid from the second pump 38 to the fluid inlet 30 of the steering control valve 18 through a conduit 60 that extends from the conduit 46 to the fluid supply conduit 32. The conduit 60 includes a check valve 62 to help prevent fluid flow through the conduit in a direction back toward the second pump 38. The conduit 60 also connects to the fluid supply conduit 32 upstream or ahead of a connection between the fluid supply conduit and the valve 44.

Stated differently, in the first position of the valve spool 50, which represents a fully closed position of the valve 44, the valve 44 directs an operating flow of fluid from the second pump 38 to the power steering motor assembly 12. In the second position of the valve spool 50, which represents a fully open position of the valve 44, the valve 44 directs a return flow of fluid from the second pump 38 to the bypass tank 27 of the fluid reservoir 26. In the second position of the valve spool 50, no fluid will be directed from the second pump 38 to the steering control valve 18 or to the hydraulic power steering motor assembly 12 through the conduit 60.

The pressure differential that is applied to the valve spool 50 to control the position of the valve spool is obtained or derived from a fixed area control orifice 34 in the fluid supply conduit 32. More particularly, the fluid output 28 of the first pump 22 is in fluid communication with an upstream side of the control orifice 34. The conduit 60 connects to the fluid supply conduit 32 upstream of the control orifice 34 and thus is also in fluid communication with the upstream side of the control orifice. Fluid pressure from the upstream side of the control orifice 34 is also communicated to a surface 58a of one end portion 58 (i.e., the left end portion as viewed in FIG. 1) of the valve spool 50 by the fluid supply conduit 32. Fluid pressure from the downstream side of the control orifice 34 is communicated to an opposed surface 59a of the opposite end portion 58 (i.e., the right end portion as viewed in FIG. 1) of the valve spool 50 by a conduit 66. The fluid pressure conducted through the conduit 66 and applied to the right end portion 59 (as viewed in FIG. 1) of the valve spool 50 is assisted by the return spring 56 disposed between a right end portion of the valve housing 52 and the valve spool. The position of the valve spool 50 relative to the valve housing 52 of the valve 44 is thus controlled by the pressure drop across the control orifice 34 or, in effect, by the speed of the engine 36.

More specifically, when the speed of the engine 36 decreases, the difference in pressure between the upstream and downstream sides of the control orifice 34 or pressure drop across the control orifice decreases. The valve spool 50 of the valve 44 moves to the left, as viewed in FIG. 1 s in response to the relatively low pressure drop across the control orifice 34, which allows the return spring 56 to have a greater effect on the valve spool 50, As the valve spool 50 moves to the left, the flow of fluid to the bypass tank 27 of the fluid reservoir 26 decreases, and the flow of fluid through the fluid supply conduit 32 to the steering control valve 18 and to the hydraulic power steering motor assembly 12 increases. Therefore, the flow of fluid from the second pump 38 to the power steering motor assembly 12 increases when the speed of the engine 36 decreases.

When the speed of the engine 36 increases, the difference in pressure between the upstream and downstream sides of the control orifice 34 or pressure drop across the control orifice increases. The valve spool 50 of the valve 44 moves toward the right, as viewed in FIG. 1, in response to the relatively high pressure drop across the control orifice 34, which at least partially offsets the effect of the return spring 56 on the valve spool 50. As the valve spool 50 moves toward the right, the flow of fluid through to the bypass tank 27 of the fluid reservoir 26 increases, and the flow of fluid through the fluid supply conduit 32 to the steering control valve 18 and to the hydraulic power steering motor assembly 12 decreases. Therefore, the flow of fluid from the second pump 38 to the power steering motor assembly 12 decreases when the speed of the engine 36 increases.

The amount of fluid from the second pump 38 directed to the steering control valve 18 and to the fluid reservoir 26 is also determined or controlled by a bypass valve 68. The bypass valve 68 is located upstream of the valve 44 and upstream of the conduit 60. Although the bypass valve 68 is shown schematically in FIG. 1 as directing fluid to the fluid reservoir 26, the bypass valve may simply direct fluid back to the fluid input 40 of second pump 38.

The bypass valve 68 includes a valve spool 70 movable axially in a valve housing 72. The position of the valve spool 70 relative to the valve housing 72 is controlled by an electrically-actuated solenoid 74 and an associated return spring 76. The valve spool 70 may have only two positions—a first position in which the bypass valve 68 is folly closed and a second position in which the bypass valve 68 is fully open. In the fully closed or first position of the bypass valve 68, which is shown in FIG. 1, none of the fluid flow from the fluid output 42 of the second pump 38 is directed to the fluid reservoir 26, and all of the fluid flow from the fluid output 42 of the second pump 38 is directed to the steering control valve 18 and/or the valve 44. In the fully open or second position of the bypass valve 68, which is not shown in FIG. 1, all of the fluid flow from the fluid output 42 of the second pump 38 is directed to the fluid reservoir 26, and none of the fluid flow from the fluid output 42 of the second pump 38 is directed to the steering control valve 18 and/or the valve 44. The solenoid 74 may, however, be operable such that the valve spool 70 has multiple different positions in the valve housing 72. The relative amounts of fluid flow from the second pump 38 being directed to the fluid reservoir 26, on the one hand, and to the steering control valve 18 and/or the valve 44, on the other hand, may thus be varied through a range of multiple and, potentially, infinite relative fluid flows. The range of relative fluid flows would include all of the fluid flow being directed to the fluid reservoir 26 and none of the fluid flow being directed to the control valve and/or the valve 44 and, at the opposite extreme, no fluid flow being directed to the fluid reservoir 26 and all of the fluid flow being directed to the steering control valve 18 and/or the valve 44.

As can be seen from the foregoing description, the bypass valve 68 operates as a control device to modify the operating flow of fluid and/or the return flow of fluid that would otherwise be directed by the valve 44. More particularly, if the bypass valve 68 is in its fully closed or first position, the valve 44 will determine the operating flow of fluid to the hydraulic power steering motor assembly 12 and the return flow of fluid to the bypass tank 27 of the fluid reservoir 26 in accordance with or based on the pressure differential across the control orifice 34, which is the result of the fluid flow from the fluid output 28 of first pump 22 and, potentially, some or all of the fluid flow from the fluid output 42 of the second pump 38. If the bypass valve 68 is then operated or actuated to move into its fully open or second position, no fluid flow from the fluid output 42 of the second pump 33 will be directed into the fluid supply conduit 32 or, therefore, into the control orifice 34. The pressure differential across the control orifice 34 may thus be modified and the position of the valve spool 50 in the valve 44 may consequently change and thereby change or modify the operating flow of fluid to the hydraulic power steering motor assembly 12 and/or the return flow of fluid to the bypass tank 27 of the fluid reservoir 26 in accordance with or based on the modified pressure differential across the control orifice 34. As will be apparent from the foregoing, the valve spool 70 of the bypass valve 68 is a member that moves from a first position to a second position when the bypass valve 68 is operated or actuated to move from its first position to its second position.

The power steering motor assembly 12 may be of the well known integral type and includes a housing 80, which encloses a piston 82. The piston 82 cooperates with the housing 80 to define a head end chamber 84 and a rod end chamber 86. The steering control valve 18 controls fluid flow to and from the head end and rod end chambers 84 and 86 in a known manner in response to rotation of the input shaft 20. Fluid discharged from the power steering motor assembly 12 is conducted to the fluid reservoir 26 via a conduit 31.

The piston 82 has a linear array of rack teeth 88, which are disposed in meshing engagement with an arcuate array of pinion teeth 90. The pinion teeth 90 are disposed on a sector gear 92, which is connected with a steering linkage 94. The power steering motor assembly 12 has a known construction, which is generally similar to the construction of the power steering motor assembly disclosed in U.S. Pat. No. 6,546,322. The power steering motor assembly 12 may, however, have a different type of construction, if desired.

The first pump 22 has a pumping volume or capacity or is sized so as to provide a fluid flow required by the power steering motor assembly 12 to effect a first vehicle maneuver when the speed of the engine 36 is at or above (in other words, equal to or greater than) a first predetermined speed, which may correspond to the vehicle (not shown) cruising at highway speed, such as, for example, 55 miles per hour. The first vehicle maneuver may involve a steering maneuver to maintain the vehicle in position in a lane of a roadway, as, for example, when the roadway curves or otherwise deviates from a straight line. The first vehicle maneuver may also involve a steering maneuver to cause the vehicle gradually to change from one lane of a roadway to an adjacent lane. When the speed of the engine 36 is at or above the first predetermined speed, therefore, the valve 44 will be operated or actuated to move the valve spool 50 from its first position to its second position in order to return all of the fluid flow from the second pump 38 to the fluid reservoir 26 as the fluid flow from the first pump 22 will be sufficient to enable the power steering motor assembly 12 to effect the first vehicle maneuver.

The second pump 38 has a pumping volume or capacity or is sized so as to provide a fluid flow that, when combined with the fluid flow of the first pump, results in a fluid flow to the power steering motor assembly 12 sufficient for the power steering assembly to effect a vehicle parking maneuver when the speed of the engine 36 is at or below (in other words, equal to or less than) a second predetermined speed corresponding to the vehicle (not shown) conducting parking maneuvers. As the second predetermined speed of the engine 36 will typically be less than the first predetermined speed of the engine and as both the first pump 22 and the second pump 38 are being driven by the engine in the hydraulically assisted steering system 10, both the first pump 22 and the second pomp 38 will be delivering lower fluid flows when the engine is operating at a speed at or below the second predetermined speed than when the engine is operating at a speed at or above the first predetermined speed.

If the vehicle (not shown) is cruising at highway speed and the engine 36 is thus at or above the first predetermined speed, there may be a need for vehicle to execute a second vehicle maneuver, such as, for example, an abrupt collision-avoidance maneuver. The fluid flow required by the power steering motor assembly 12 to effect such a second vehicle maneuver will be greater than the fluid flow required by the power steering motor assembly to effect the first vehicle maneuver, such as a lane maintenance maneuver or a gradual lane change maneuver. The fluid flow required by the power steering motor assembly 12 to effect such a second vehicle maneuver at any given engine speed at or above the first predetermined speed will thus also be greater than the fluid flow that can be delivered by the first pump 22. Some or all of the fluid flow from the second pump 38 will then be required to enable the power steering motor assembly 12 to effect the second vehicle maneuver.

In the hydraulically assisted steering apparatus or system 10 of FIG. 1, the bypass valve 68 will be operated or actuated to move or, in some situations, de-actuated to permit the return spring 76 to move the valve spool 70 from its second position to its first position in order to provide sufficient fluid flow, from the second pump 38 in combination with the fluid flow from the first pump 22, to enable the power steering motor assembly 12 to effect the second vehicle maneuver. In order to detect when the second vehicle maneuver is occurring, the hydraulically assisted steering system 10 includes a sensor 78, such as a steering wheel turning rate sensor, which provides an electrical signal indicative of a rate of turning of the vehicle steering wheel 21 at or above a predetermined vehicle steering wheel turning rate.

The signal from the sensor 78 may be delivered to a controller 96, such as a vehicle on-board computer, which is operatively connected electrically with the solenoid 74 and which can either operate or actuate the solenoid to move the valve spool 70 from its second position to or toward its first position or de-actuate the solenoid so that the return spring 76 moves the valve spool from its second position to its first position. The sensor 78 may be any type of sensor that senses a condition indicative of the second vehicle maneuver and therefore is capable of detecting when the second vehicle maneuver is occurring or when the second vehicle maneuver is anticipated. Thus, for example, the sensor 78 may detect the angle through which the steering wheel 21 is turned and/or the torque applied to the steering wheel 21.

The sensor 78 may alternatively detect that brakes (not shown) of a vehicle are being applied when the engine is at or above the first predetermined speed, which may be an indicator that the second vehicle maneuver is anticipated or likely to occur.

The sensor 78 may also be one of several sensors providing signals to the controller 96. In such a situation, the controller 96 may be programmed to use a signal from one or more than one of the sensors to determine whether and when to operate or actuate the solenoid 74 to move the valve spool 70 from its second position to or toward its first position or to de-actuate the solenoid so that the return spring 76 moves the valve spool from its second position to its first position. The use of sensors, such as sensor 78, to detect the position or other conditions of the steering wheel 21 or to sense or detect the conditions of other vehicle components permits the solenoid 74 and thus the bypass valve 68 to be operated or actuated in response to inputs other than steering demand from the steering control valve 18 and, thus, engine speed.

By sizing the first pump 22 or constructing the first pump with a pumping volume or capacity so as to provide a fluid flow required by the power steering motor assembly 12 to effect a first vehicle maneuver, such as maintaining the vehicle in position in a lane of a roadway, when the speed of the engine 36 is at or above the first predetermined speed, the hydraulically assisted steering system 10 will consume less energy than, for example, a steering system that always provides sufficient fluid flow for all potential vehicle maneuvers at or above the first predetermined speed. Such an energy savings will occur so long as all of the fluid flow from the second pump 38 is returned to the fluid reservoir 26. Although the energy saving operation of the hydraulically assisted steering system 10 has been described with reference to when the speed of the engine 36 is at or above the first predetermined speed, bypass valve 68 may also be operated to return all of the fluid flow from the second pump 38 to the fluid reservoir 26 when, for example, the vehicle (not shown) is stopped at a traffic light and the engine 36 is at an idling speed.

Figure 2:
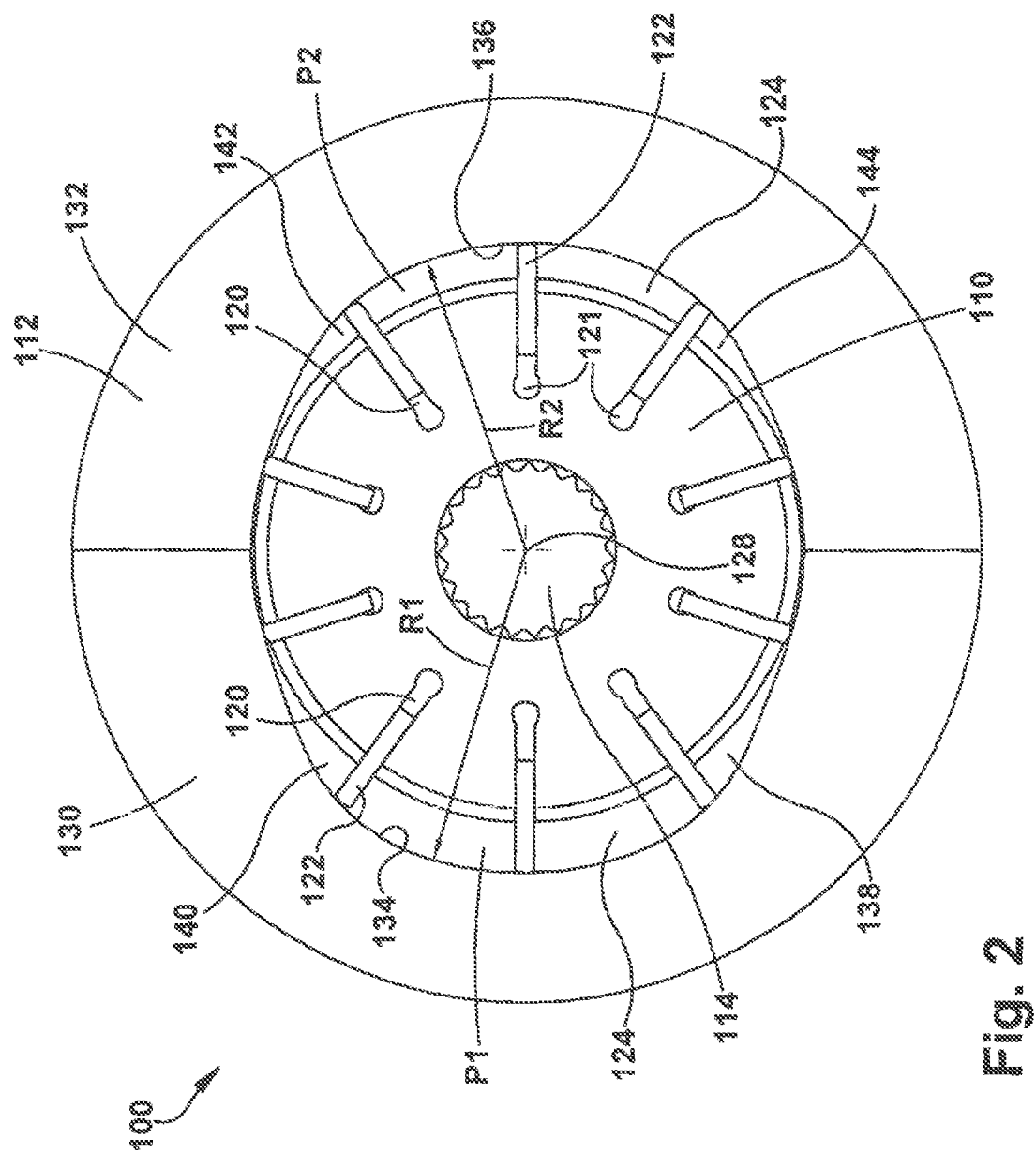
FIG. 2 is a schematic illustration of an embodiment of a pump that may be used in the power steering apparatus of FIG. 1.

The first pump 22 and the second pump 38 of the hydraulically assisted steering system 10 of FIG. 1 may be portions of a single pumping mechanism, such as the pumping mechanism Illustrated in FIG. 7 of U.S. Pat. No. 9,315,208. As shown in FIG. 2, such a pumping mechanism 100 includes a rotor 110 and a cam ring 112. The rotor 110 is connected with an input shaft 114. The rotor 110 and input shaft 114 rotate together relative to the cam ring 112. The input shaft 114 may be connected directly or indirectly, through, for example, a reduction gearing mechanism, with the output shaft 48 of the engine 36. Alternatively, the input shaft 114 may be the output shaft 48 so that the rotor 110 is directly connected to the output shaft 48. With either construction, the rotor 110 may rotate at the same speed as the engine 36 or at a fixed fraction or percentage or at a fixed multiple of the speed of the engine.

The rotor 110 includes a plurality of radial slits 120. Vanes 122 are located in the slits 120. The radially inner ends or bottoms 121 of the slits 120 receive fluid pressure to move the vanes into engagement with the cam ring 112. The vanes 122, together with the rotor 110 and the cam ring 112, thus define a plurality of pumping chambers 124 located between adjacent vanes.

The cam ring 112 includes a first generally semicircular portion 130 connected to a second generally semicircular portion 132. The first semicircular portion 130 has a first interior elliptical surface 134, which is presented toward the second generally semicircular portion 132. At each point along the arcuate extant of the first interior elliptical surface 134, the first interior elliptical surface 134 is spaced apart from a longitudinal centerline 123 of the rotor 110 and the input shaft 114 by a first distance R1. Because the first interior elliptical surface 134 is elliptical, the first distance R1 is different at each point along the arcuate extent of the first interior elliptical surface. The space between the first interior elliptical surface 134 and the rotor 110 defines a first pumping volume P1. The second semicircular portion 132 has a second interior elliptical surface 136, which is presented toward the first generally semicircular portion 130 and the first interior elliptical surface 134. At each point along the arcuate extent of the second interior elliptical surface 136, the second interior elliptical surface 136 is spaced apart from the longitudinal centerline 128 of the rotor 110 and the input shall 114 by a second distance R2. Because the second interior elliptical surface 136 is elliptical, the second distance R2 is different at each point along the arcuate extent of the second interior elliptical surface. The space between the second interior elliptical surface 136 and the rotor 110 defines a second pumping volume P2.

At corresponding points along the arcuate extents of the first interior elliptical surface 134 and the second interior elliptical surface 136 in a given direction of rotation (i.e., clockwise or counter-clockwise), the distance R2 may be larger than the distance R1. Consequently, the second pumping volume P2 is larger than the first pumping volume P1. During rotation of the rotor 110 relative to the earn ring 112, the second pumping volume P2 pumps or discharges more fluid than the first pumping volume P1 even though the rotor is turning at a constant speed. Although the first and second generally semicircular portions 130 and 132 are shown as separate components, the first and second generally semicircular portions 130 and 132 could be formed as one piece.

The first pumping volume P1 may be used as the first pump 22 in the steering apparatus or hydraulically assisted steering system 10 of FIG. 1, and the second pumping volume P2 may be used as the second pump 38. The first pumping volume P1 may, for example, provide 28% of the flow required by the steering apparatus or hydraulically assisted steering system 10 for parking maneuvers at engine speeds at or below the second predetermined speed. The second pumping volume P2 may, for example, provide 72% of the flow required by the steering apparatus for parking maneuvers at engine speeds at or below the second predetermined speed. Stated differently, the first pumping volume P1 may, for example, have a volume of about 5 cubic centimeters and the second pumping volume P2 may, for example, have a volume of about 13 cubic centimeters.

The pumping mechanism 100 includes an inlet and an outlet for each of the first and second pumping volumes P1 and P2. More particularly, the inlet (not shown) for the first pumping volume P1 corresponds to the fluid input 24 of the first pump 22 and is in fluid communication with a fluid inlet portion 138 of the first pumping volume PI The outlet (not shown) for the first pumping volume P1 corresponds to the fluid output 28 of the first pump 22 and is in fluid communication with a fluid outlet portion 140 of the first pumping volume P1. Similarly, the inlet (not shown) for the second pumping volume P2 corresponds to the fluid input 40 of the second pump 38 and is in fluid communication with a fluid inlet portion 142 of the second pumping volume P2. The second pumping volume P2 also has an outlet (not shown), which corresponds to the fluid output 42 of the second pump 38 and which is in fluid communication with a fluid outlet portion 144 of the second pumping volume P2.

As shown in FIG. 2, the locations of the fluid inlet portions 138 and 142 and the fluid outlet portions 140 and 144 of the first and second pumping volumes P1 and P2, respectively, are such that the rotor 110 and the input shaft 114 must rotate in a clockwise direction as viewed in FIG. 2. The rotor 110 and the input shaft 114 may, however, rotate in a counterclockwise direction as viewed in FIG. 2, in which case the locations of the fluid inlet portion 138 and the fluid outlet portion 140 of the first pumping volume PI would be reversed, and the locations of the fluid inlet portion 142 and the fluid outlet portion 144 of the second pumping volume P2 would also be reversed.

Figure 3:
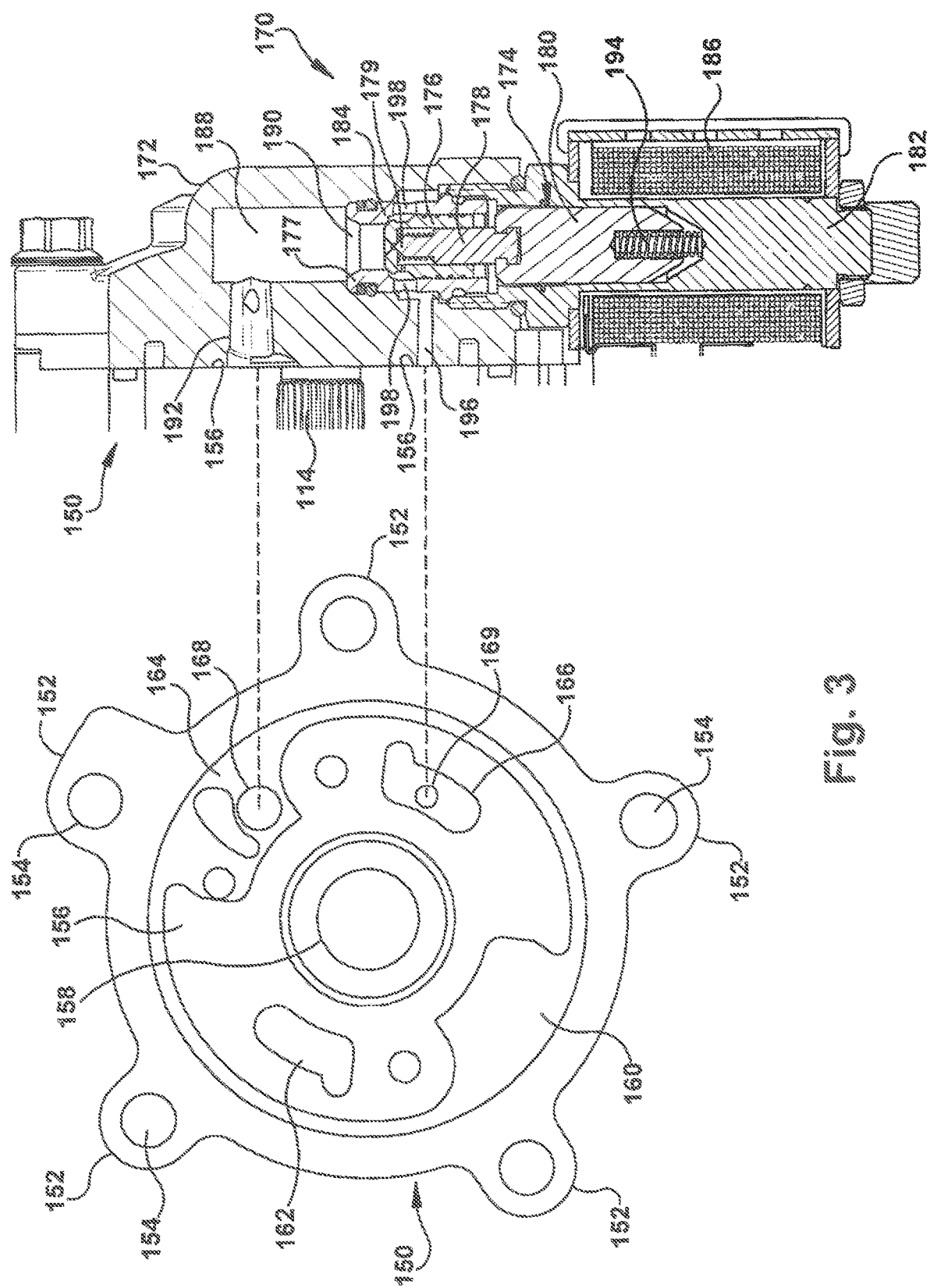
FIG. 3 is a schematic illustration of an end cover and bypass valve that may be used with the pump of FIG. 2.

To complete the first and second pumping volumes P1 and P2, end covers may be disposed adjacent to each longitudinal end of the cam ring 112 so as to extend across the cam ring in planes substantially perpendicular to the longitudinal centerline 128 of the rotor 110 and the input shaft 114. One such end cover 150 is shown in FIG. 3. The end cover 150 is circular in shape and has five radially outwardly extending lugs 152. A hole 154 is formed in each lug 152 to receive a fastener, such as a threaded bolt (not shown), to help secure the end cover 150, directly or indirectly, to the cam ring 112 or to a housing (not shown) in which the cam ring may be mounted.

An interior surface (not shown) of the end cover 150 is presented toward the cam ring 112 and helps to define the first and second pumping volumes P1 and P2. As illustrated in FIG. 3, an opposite exterior surface 156 of the end cover 150 is presented away from the cam ring 112, as illustrated in FIG. 2. The exterior surface 156 is thus viewed in FIG. 3 in a direction that is the same as the direction in which the cam ring 112 is viewed in FIG. 2, and the locations of the inlets and outlets in the end cover 150 are aligned with the locations of the fluid inlet portions 138 and 142 and the fluid outlet portions 140 and 144 of the first and second pumping volumes P1 and P2, respectively, shown in FIG. 2.

In the center of the exterior surface 156 is a circular opening 158 that receives an end of the input shaft 114. Located radially outward of the circular opening 158 is a recessed first inlet portion 160 of the exterior surface 156. The recessed first inlet portion 160 defines or provides a passage that is in fluid communication both with the inlet (not shown) to the first pumping volume P1 and with the fluid inlet portion 138 of the first pumping volume P1. Also boated radially outward of the circular opening 158 and spaced apart from the recessed first inlet portion 160 of the exterior surface 156 around the circumference of the end cover 150 is a recessed first outlet portion 162 of the exterior surface 156. The recessed first outlet portion 162 defines or provides a passage that is in fluid communication both with the outlet (not shown) from the first pumping volume P1 and with the fluid outlet portion 140 of the first pumping volume P1.

Similarly, located radially outward of the circular opening 158 is a recessed second inlet portion 164 of the exterior surface 156. The recessed second inlet portion 164 is spaced apart from the recessed first inlet portion 160 and the recessed first outlet portion 162 of the exterior surface 156 around the circumference of the end cover 150. The recessed second inlet portion 164 defines or provides a passage that is in fluid communication both with the inlet (not shown) to the second pumping volume P2 and with the fluid inlet portion 142 of the second pumping volume P2. Also located radially outward of the circular opening 158 and spaced apart from the recessed first inlet portion 160, the recessed first outlet portion 162, and the recessed second inlet portion 164 of the exterior surface 156 around the circumference of the end cover 150 is a recessed second outlet portion 166 of the exterior surface 156. The recessed second outlet portion 166 defines or provides a passage that is in fluid communication both with the outlet (not shown) from the second pumping volume P2 and with the fluid outlet portion 144 of the second pumping volume P2.

To facilitate operation or functioning of the pumping mechanism 100 in the manner described with reference to the first and second pumps 22 and 38, respectively, of FIG. 1, an inlet bypass opening or passage 168 is formed in the recessed second inlet portion 164 of the exterior surface 156. The inlet bypass passage 168 extends entirely through the end cover 150 from the recessed second inlet portion 164 of the exterior surface 156 to the opposite interior surface (not shown) of the end cover 150. Likewise, an outlet bypass opening or passage 169 is formed in the recessed second outlet portion 166 of the exterior surface 156. The outlet bypass passage 169 extends entirely through the end cover 150 from the recessed second outlet portion 166 of the exterior surface 156 to the opposite interior surface (not shown) of the end cover 150.

The inlet bypass passage 168 and the outlet bypass passage 169 are in fluid communication with a bypass valve 170, which is similar in construction and operation to the valve 44 of FIG. 1. The bypass valve 170 includes a valve housing 172 and a valve spool 174 that is movable lengthwise in the valve housing. As shown in FIG. 3, the valve housing 172 is securely attached to the end cover 150 by, for example, a bolt or other fastener that is received in one of the lugs 152 of the end cover. As also shown in FIG. 3, the valve spool 174 includes three components, namely, a first spool member 176, a second spool member 178, and a third spool member 180, which arranged in a coaxial and partially overlapping configuration. The first, second, and third spool members 176, 178, and 180 are received in a cartridge housing 182. The first and second spool members 176 and 178 also project into a sleeve 184, which is coaxial with the cartridge housing 182 and which is held in place against axial or longitudinal movement by the cartridge housing. Encircling the cartridge housing 182 is an electrical coil 186, which is connected to an electrical power source (not shown) and which is operable to cause the bypass valve 170 to operate as a solenoid valve.

The sleeve 184 is received in a passage 188 formed in the valve housing 172 such that an end of the sleeve abuts a ledge formed in the valve housing partway along the length of the passage. An opening 190 is formed in the end of the sleeve 184 so that the interior of the sleeve is in fluid communication with the passage 188. The passage 188, in turn, is in fluid communication with a bypass valve outlet passage 192 formed to extend through the valve housing 172 perpendicular to the passage 188. The bypass valve cutlet passage 192 is in fluid communications with the inlet bypass opening or passage 168 in the end cover 150 of the pumping mechanism 100.

The first spool member 176 of the valve spool 174, which is tubular in configuration, is received in the interior of the sleeve 184 such that an end 177 of the first valve member abuts and seats against a lodge or valve seat formed on an interior surface of the sleeve. The second spool member 178, which is cylindrical in configuration with a point 179 at one end, is received in the interior of the first spool member 176 such that the point abuts and seats against a ledge or valve seat formed around a pilot pressure passage in an end of the first spool member 176. The end of the second spool member 178 opposite the point is attached to the third spool member 180 for longitudinal or lengthwise movement together with the third spool member. A return spring 194 is interposed between an end of the third spool member 180 and the cartridge housing 182 in which the third spool member is received. The return spring 184 normally biases the third spool member 180 and thus the second spool member 178 against the first spool member 176, which is thus pressed tightly against and in sealing engagement with the valve seat in the interior of the sleeve 184.

When the electrical coil 186 is energized, the third spool member 180 is drawn against the bias of the return spring 194 into the interior of the cartridge housing 182 and pulls the second spool member 178 in the same direction. The pressure or load of the return spring 194 pressing the first spool member 176 against the valve seat in the sleeve 184 is thus relieved, and the first spool member 176 can move away from the valve seat. The first spool member 176 is pushed away from the valve seat in the sleeve 184 by fluid pressure communicated by a bypass valve inlet passage 196, which extends through the valve housing 172 perpendicular to the passage 188 in the valve housing 172. The bypass valve inlet passage 196 is in fluid communication with the outlet bypass opening or passage 169 in the end cover 150 of the pumping mechanism 100 and is also in fluid communication with an array of openings 198 that extend through the sleeve 184 to the first spool member 176.

As the first spool member 176 is pushed away from the valve seat in the sleeve 184, fluid is free to flow from the recessed second outlet portion 166 of the exterior surface 156 of the end cover 150, through the outlet bypass passage 169, through the bypass valve inlet passage 196, and past the first spool member 176. Fluid flowing past the first spool member 176 then flows through the opening 190 in the end of the sleeve 184, through the passage 188 in the valve housing 172, through the bypass valve outlet passage 192, through the inlet bypass passage 168 in the end cover 150, and thus to the recessed second inlet portion 164 of the exterior surface 156 of the end cover. In summary, therefore, when the electrical coil 186 is energized and the bypass valve 170 is opened, fluid from the fluid outlet portion 144 of the second pumping volume P2 flows through the bypass valve back to the fluid inlet portion 142 of the second pumping volume P2 and does not flow toward the power steering motor assembly 12.

FIGS. 4A and 4B illustrate a portion of a hydraulically assisted steering apparatus or system 200 for a vehicle (not shown), in accordance with a second example of the present invention. More specifically, FIGS. 4A and 4B illustrate only the portion of the hydraulically assisted steering system 200 corresponding to the left hand portion of the hydraulically assisted steering system 10 shown in FIG. 1. The elements of the hydraulically assisted steering system 200 that correspond to the steerable vehicle wheels 14 and 16, the steering control valve 18, the input shaft 20, and the manually rotatable vehicle steering wheel 21 of FIG. 1 are thus not illustrated in FIGS. 4A and 4B, and the hydraulic power steering motor assembly 12 is indicated only by a box, but the hydraulically assisted steering apparatus or system 200 does include those elements.

In the hydraulically assisted steering apparatus or system 200, a first pump 222 has a fluid input 224 connected in fluid communication with a fluid reservoir 226. A fluid output 228 of the first pump 222 is connected in fluid communication with a fluid inlet (not shown) of the steering control valve (not shown) by a fluid supply conduit 232. The first pump 222 is continuously driven by an engine (not shown) of the vehicle, during operation of the engine. Therefore, during operation of the engine (not shown), the first pump 222 continuously supplies fluid under pressure to the power steering motor assembly 12.

A second pump 238 has a fluid input 240 connected in fluid communication with the fluid reservoir 226. A fluid output 242 of the second pump 238 is connected in fluid communication with a valve 244 by a conduit 246. The second pump 238 is continuously driven by the engine (not shown) of the vehicle, during operation of the engine. The first and second pumps 222 and 238 may be mounted on the same output shaft (not shown) of the engine. The first and second pumps 222 and 238 may thus be driven at the same speed, which may be the speed of the engine (not shown).

A valve spool 250 moves in one direction in a valve housing 252 of the valve 244 under the influence of an electrically actuated solenoid or linear actuator 254 or under the influence of a pressure differential. The valve spool 250 moves in an opposite direction in the valve housing 252 under the influence of a biasing return spring 256.

In a first position of the valve spool 250, as shown in FIG. 4A, the valve 244 blocks fluid flow from the second pump 238 to the fluid reservoir 226 or a bypass tank 227 of the fluid reservoir and instead directs fluid from the second pump 238 to the steering control valve (not shown) and the hydraulic power steering motor assembly 12 through a conduit 260 that is fluid communication with the fluid supply conduit 232. The conduit 260 includes a check valve 262 to help prevent fluid flow through the conduit in a direction back toward the second pump 238. The conduit 260 also connects to the fluid supply conduit 232 upstream or ahead of a connection between the fluid supply conduit and the valve 244.

In a second position of the valve spool 250, as shown in FIG. 4B, the valve 244 permits fluid flow from the second pump 238 to the fluid reservoir 226 or the bypass tank 227. In the second position of the valve spool 250, which represents a fully open position of the valve 244, no fluid will be directed from the second pump 238 to the steering control valve (not shown) or to the hydraulic power steering motor assembly 12 through the conduit 260.

Stated differently, in the first position of the valve spool 250, which represents a fully closed position of the valve 244, the valve 244 directs an operating flow of fluid from the second pump 238 to the power steering motor assembly 12. In the second position of the valve spool 250, which represents a fully open position of the valve 244, the valve 244 directs a return flow of fluid from the second pump 238 to the bypass tank 227 of the fluid reservoir 226. In the second position of the valve spool 250, no fluid will be directed from the second pump 238 to the steering control valve (not shown) or to the hydraulic power steering motor assembly 12 through the conduit 260.

The amount of fluid from the second pump 238 directed to the control valve (not shown) and to the fluid reservoir 226 or the bypass tank 227 of the fluid reservoir is determined by the position of the valve spool 250 in the valve housing 252 of the valve 244. The position of the valve spool 250 relative to the valve housing 252 may be controlled by the linear actuator 254. As shown in FIGS. 4A and 4B, the linear actuator 254 includes a shaft or elongated member 255 that is directly attached to the valve spool 250. Although the valve spool 250 has a first position in which the valve 244 is fully closed and a second position in which the valve 244 is fully open, the linear actuator 254 is operable such that the valve spool 250 has multiple different positions in the valve housing 252. The relative amounts of fluid flow from the second pump 238 being directed to the control valve (not shown) and to the fluid reservoir 226 or bypass tank 227 of the fluid reservoir may thus be varied through a range of multiple and, potentially, infinite relative fluid flows, which includes all of the fluid flow being directed to the control valve (not shown) and no fluid flow being directed to the fluid reservoir or bypass tank and, at the opposite extreme, none of the fluid flow being directed to the control valve and all of the fluid flow being directed to the reservoir or bypass tank.

Although the position of the valve spool 250 in the valve housing 252 may be controlled by the linear actuator 254, the position of the valve spool is controlled by an applied pressure differential when the linear actuator is not operating or is de-actuated. More particularly, the fluid output 228 of the first pump 222 is in fluid communication with an upstream side of a fixed area control orifice 234 in the fluid supply conduit 232. Fluid pressure from the upstream side of the control orifice 234 is communicated to a surface 258a of one end portion 258 (i.e., the left end portion as viewed in FIGS. 4A and 4B) of the valve spool 250 by the fluid supply conduit 232. Fluid pressure from the downstream side of the control orifice 234 is communicated to an opposed surface 259a of the opposite end portion 259 (i.e., the right end portion as viewed in FIGS. 4A and 4B) of the valve spool 250 by a conduit 236. The fluid pressure conducted through the conduit 236 and applied to the right end portion 259 (as viewed in FIGS. 4A and 4B) of the valve spool 250 is assisted by the return spring 256 disposed between a right end portion of the valve housing 252 and the valve spool. The position of the valve spool 250 relative to the valve housing 252 of the valve 244 is thus controlled by the pressure drop across the fixed area control orifice 234 or, in effect, by the speed of the engine (not shown), when the linear actuator 254 is not being operated or is de-actuated.

More specifically, when the speed of the engine (not shown) decreases and the linear actuator is not operating or is de-actuated, the pressure drop across the fixed area control orifice 234 decreases. The valve spool 250 of the valve 244 moves to the left, as viewed in FIGS. 4A and 4B, in response to the relatively low pressure drop across the control orifice 234, which allows the return spring 256 to have a greater effect on the valve spool 250. As the valve spool 250 moves to the left, the flow of fluid to the fluid reservoir 226 or the bypass tank 227 of the fluid reservoir decreases, and the flow of fluid through the fluid supply conduit 232 to the control valve (not shown) and to the hydraulic power steering motor assembly 12 increases. Therefore, the flow of fluid from the second pump 238 to the power steering motor assembly 12 increases when the speed of the engine (not shown) decreases. The combined flow of fluid from the first and second pumps 222 and 238 supplies fluid to the power steering motor assembly 12 to turn the steerable vehicle wheels (not shown). When the speed of the engine (not shown) is below the second predetermined speed, as previously defined with reference to the hydraulically assisted steering apparatus or system 10 of FIG. 1, such as when the vehicle is conducting parking and similar maneuvers, the entire flow of fluid from the second pump 238 is directed to the power steering motor assembly 12.

When the speed of the engine (not shown) increases and the linear actuator is not operating or is de-actuated, the pressure drop across the fixed area control orifice 234 increases. The valve spool 250 of the valve 244 moves toward the right, as viewed in FIGS. 4A and 4B, in response to the relatively high pressure drop across the control orifice 234, which at least partially offsets the effect of the return spring 256 on the valve spool 250. As the valve spool 250 moves toward the right, the flow of fluid through to the fluid reservoir 226 or the bypass tank 227 of the fluid reservoir increases, and the flow of fluid through the fluid supply conduit 232 to the control valve (not shown) and to the hydraulic power steering motor assembly 12 decreases. Therefore, the flow of fluid from the second pump 238 to the power steering motor assembly 12 decreases when the speed of the engine (not shown) increases. When the speed of the engine (not shown) is at or above the first predetermined speed, as previously defined with reference to the hydraulically assisted steering apparatus and system 10 of FIG. 1, the entire flow of fluid from the second pump 233 is directed to the fluid reservoir 226 or the bypass tank 227 of the fluid reservoir.

The first pump 222 has a pumping volume or capacity or is sized so as to provide a fluid flow required by the power steering motor assembly 12 to effect a first vehicle maneuver, as previously defined with reference to the hydraulically assisted steering apparatus or system 10 of FIG. 1. when the speed of the engine (not shown) is at or above the first predetermined speed. The second pump 238 has a pumping volume or capacity or is sized so as to provide a fluid flow that, when combined with the fluid flow of the first pump 222, results in a fluid flow to the power steering motor assembly (not shown) sufficient for the power steering assembly to effect a vehicle parking maneuver when the speed of the engine (not shown) is at or below the second predetermined speed, as previously defined with reference to the hydraulically assisted steering apparatus or system 10 of FIG. 1. As the second predetermined speed of the engine (not shown) will typically be less than the first predetermined speed of the engine and as both the first pump 222 and the second pump 238 are being driven by the engine in the hydraulically assisted steering system 200, both the first pump 222 and the second pump 238 will be delivering lower fluid flows when the engine is operating at or below the second predetermined speed than when the engine is operating at or above the first predetermined speed.

If the vehicle (not shown) is cruising at highway speed and the engine (not shown) is thus at or above the first predetermined speed, there may be a need for vehicle to execute a second vehicle maneuver, as previously defined with reference to the hydraulically assisted steering apparatus or system 10 of FIG. 1, such as, for example, an abrupt collision-avoidance maneuver. The fluid flow required by the power steering motor assembly 12 to effect such a second vehicle maneuver will be greater at any given engine speed at or above the first predetermined speed than the fluid flow required by the power steering motor assembly to effect the first vehicle maneuver, such as a lane maintenance maneuver. The fluid flow required by the power steering motor assembly 12 to effect such a second vehicle maneuver will thus also be greater than the fluid flow that can be delivered by the first pump 222. Some or all of the fluid flow from the second pump 238 will then be required to enable the power steering motor assembly 12 to effect the second vehicle maneuver.

In the hydraulically assisted steering apparatus or system 200 of FIGS. 4A and 4B, the linear actuator 254 may be operated to move the valve spool 250 from its second position to or toward its first position in order to provide sufficient fluid flow, from the second pump 238 in combination with the fluid flow from the first pump 222, to enable the power steering motor assembly (not shown) to effect the second vehicle maneuver. As can be seen from the foregoing description, the linear actuator 254 operates as a control device to modify the operating flow of fluid and/or the return flow of fluid that would otherwise be directed by the valve 244. More particularly, if the linear actuator 254 is de-actuated, the valve 244 will determine the operating flow of fluid to the hydraulic power steering motor assembly 12 and the return flow of fluid to the bypass tank 227 of the fluid reservoir 226 in accordance with or based on the pressure differential across the control orifice 234, which is the result of the fluid flow from the fluid output 228 of first pump 222 and, potentially, some or all of the fluid flow from the fluid output 242 of the second pump 238. The shaft or elongated member 255, which is directly attached to the valve spool 250, will thus be in a first position determined by the valve spool 250. if the linear actuator 254 is then operated or actuated to move the shaft or elongated member 255 into a different position against one of the pressures applied to the valve spool from the control orifice 234, the valve spool 250 will also move into a different position. The modified position of the valve spool 250 in the valve 244 may consequently change or modify the operating flow of fluid to the hydraulic power steering motor assembly 12 and/or the return flow of fluid to the bypass tank 227 of the fluid reservoir 226.

In order to detect when the second vehicle maneuver is occurring, the hydraulically assisted steering system 200 includes a sensor (not shown), such as a steering wheel turning rate sensor, like the sensor 78 of the hydraulically assisted steering system 10 of FIG. 1, which provides an electrical signal indicative of a rate of turning of the vehicle steering wheel (not shown) at or above a predetermined vehicle steering wheel turning rate.

The signal from the sensor (not shown) may be delivered to a controller (not shown), such as a vehicle on-board computer, which is operatively connected electrically with the linear actuator 254 and which can operate the linear actuator to move the valve spool 250 from its second position to its first position or to any intermediate position. The sensor (not shown) may be any type of sensor that senses a condition indicative of the second vehicle maneuver and therefore is capable of detecting when the second vehicle maneuver is occurring or when the second vehicle maneuver is anticipated. Thus, for example, the sensor may detect the angle through which the steering wheel is turned and/or the torque applied to the steering wheel. The sensor 78 may alternatively detect that brakes (not shown) of a vehicle are being applied when the engine is at or above the first predetermined speed, which may be an indicator that the second vehicle maneuver is anticipated or likely to occur.

The sensor (not shown) may also be one of several sensors providing signals to the controller (not shown). In such a situation, the controller may be programmed to use a signal from one or more than one of the sensors to determine whether and when to operate or actuate the solenoid to move the valve spool 250 from its second position to or toward its first position or de-actuate the solenoid so that the return spring 256 moves the valve spool from its second position to its first position. The use of sensors to detect the position or other conditions of the steering wheel or to sense or detect the conditions of other vehicle components permits the linear actuator 254 and thus the valve 244 to be operated or actuated in response to inputs other than steering demand from the steering control valve and, thus, engine speed.

By sizing the first pump 222 or constructing the first pump with a pumping volume or capacity so as to provide a fluid flow required by the power steering motor assembly 12 to effect a first vehicle maneuver, such as maintaining the vehicle in position in a lane of a roadway, when the speed of the engine (not shown) is at or above the first predetermined speed, the hydraulically assisted steering apparatus or system 200 will consume less energy than, for example, a steering system that always provides sufficient fluid flow for all potential vehicle maneuvers at or above the first predetermined speed. Such an energy savings will occur so long as all of the fluid flow from the second pump 238 is returned to the fluid reservoir 226 or bypass tank 227 of the fluid reservoir. Although the energy saving operation of the hydraulically assisted steering system 200 has been described with reference to when the speed of the engine is at or above the first predetermined speed, linear actuator 254 may also be operated to return all of the fluid flow from the second pump 238 to the fluid reservoir 226 when, for example, the vehicle (not shown) is stopped at a traffic light and the engine is at an idling speed.

FIGS. 5A and 5B illustrate a portion of a hydraulically assisted steering apparatus or system 300 for a vehicle (not shown), in accordance with a third example of the present invention. More specifically, FIGS. 5A and 5B, like FIGS. 4A and 4B, illustrate only the portion of the hydraulically assisted steering system 300 corresponding to the left hand portion of the hydraulically assisted steering system 10 shown in FIG. 1. The elements of the hydraulically assisted steering system 300 that correspond to the steerable vehicle wheels 14 and 16, the steering control valve 18, the input shaft 20, and the manually rotatable vehicle steering wheel 21 of FIG. 1 are thus not illustrated in FIGS. 5A and 5B, and the hydraulic power steering motor assembly 12 is indicated only by a box, but the hydraulically assisted steering apparatus or system 300 does include those elements.

In the hydraulically assisted steering apparatus or system 300, a first pump 322 has a fluid input 324 connected in fluid communication with a fluid reservoir 326. A fluid output 328 of the first pump 322 is connected in fluid communication with a fluid inlet (not shown) of the steering control valve (not shown) by a fluid supply conduit 332. The first pump 322 is continuously driven by an engine (not shown) of the vehicle, during operation of the engine. Therefore, during operation of the engine (not shown), the first pump 322 continuously supplies fluid under pressure to the power steering motor assembly 12.

A second pump 338 has a fluid input 340 connected in fluid communication with the fluid reservoir 326. A fluid output 342 of the second pump 338 is connected in fluid communication with a valve 344 by a conduit 346. The second pump 238 is continuously driven by the engine (not shown) of the vehicle, during operation of the engine. The first and second pumps 322 and 338 may be mounted on the same output shaft (not shown) of the engine. The first and second pumps 322 and 338 may thus be driven at the same speed, which is the speed of the engine (not shown).

A valve spool 350 moves in one direction in a valve housing 352 of the valve 344 under the influence of a pressure differential. The valve spool 350 moves in an opposite direction in the valve housing 352 under the influence of a biasing return spring 356.

In a first position of the valve spool 350, as shown in FIG. 5A, the valve 344 blocks fluid flow from the second pump 338 to the fluid reservoir 326 or a bypass tank 327 and instead directs fluid from the second pump 338 to the steering control valve (not shown) and the hydraulic power steering motor assembly 12 through a conduit 360 that is fluid communication with the fluid supply conduit 332. The conduit 360 includes a check valve 362 to help prevent fluid flow through the conduit in a direction back toward the second pump 338. The conduit 360 also connects to the fluid supply conduit 332 upstream or ahead of a connection between the fluid supply conduit and the valve 344.

In a second position of the valve spool 350, as shown in FIG. 5B, the valve 344 permits fluid flow from the second pump 338 to the fluid reservoir 326 or the bypass tank 327. In the second position of the valve spool 350, which represents a fully open position of the valve 344, no fluid will be directed from the second pump 338 to the steering control valve (not shown) or to the hydraulic power steering motor assembly 12 through the conduit 360.

Stated differently, in the first position of the valve spool 350, which represents a fully closed position of the valve 344, the valve 344 directs an operating flow of fluid from the second pump 338 to the power steering motor assembly 12. In the second position of the valve spool 350, which represents a fully open position of the valve 344, the valve 344 directs a return flow of fluid from the second pump 338 to the bypass tank 327 of the fluid reservoir 326. In the second position of the valve spool 350, no fluid will be directed from the second pump 338 to the steering control valve (not shown) or to the hydraulic power steering motor assembly 12 through the conduit 360.

The amount of fluid from the second pump 338 directed to the control valve (not shown) and to the fluid reservoir 326 or bypass tank 327 of the fluid reservoir is determined by the position of the valve spool 350 in the valve housing 352 of the valve 344. The position of the valve spool 350 relative to the valve housing 352 is controlled by a pressure differential. Although the valve spool 350 has a first position in which the valve 344 is fully closed and a second position in which the valve 344 is fully open, the valve spool 350 may have multiple different positions in the valve housing 352. The relative amounts of fluid flow from the second pump 338 being directed to the control valve (not shown) and to the fluid reservoir 326 or bypass tank 327 may thus be varied through a range of multiple relative fluid flows, which includes all of the fluid flow being directed to the control valve (not shown) and no fluid flow being directed to the reservoir or bypass tank and, at the opposite extreme, none of the fluid flow being directed to the control valve and all of the fluid flow being directed to the reservoir or bypass tank.

The pressure differential applied to the valve spool 350 to control its position in the valve housing 352 is obtained through the use of fixed area control orifice 334 in the fluid supply conduit 332. More particularly, the fluid output 328 of the first pump 322 is in fluid communication through the fluid supply conduit 332 with an upstream side of the control orifice 334. Fluid pressure from the upstream side of the control orifice 334 is communicated to a surface 358a of one end portion 358 (i.e., the left end portion as viewed in FIGS. 5A and 5B) of the valve spool 350 by the fluid supply conduit 332. Fluid pressure from the downstream side of the control orifice 334 is communicated to an opposed surface 359a of the opposite end portion 359 (i.e., the right end portion as viewed in FIGS. 5A and 5B) of the valve spool 350 by a conduit 336. The fluid pressure conducted through the conduit 336 and applied to the right and portion 359 (as viewed in FIGS. 5A and 5B) of the valve spool 350 is assisted by the return spring 356 disposed between a right end portion of the valve housing 352 and the valve spool. The position of the valve spool 350 relative to the valve housing 352 of the valve 344 may thus be controlled by the pressure drop across the fixed area control orifice 334 or, in effect, by the speed of the engine (not shown).

More specifically, when the speed of the engine (not shown) decreases, the pressure drop across the fixed area control orifice 334 decreases. The valve spool 350 of the valve 344 moves to the left, as viewed in FIGS. 5A and 5B, in response to the relatively low pressure drop across the control orifice 334, which allows the return spring 356 to have a greater effect on the valve spool 350. As the valve spool 350 moves to the left, the flow of fluid to the fluid reservoir 326 or the bypass tank 327 decreases, and the flow of fluid through the fluid supply conduit 332 to the control valve (not shown) and to the hydraulic power steering motor assembly 12 increases. Therefore, the flow of fluid from the second pump 338 to the power steering motor assembly 12 increases when the speed of the engine (not shown) decreases. The combined flow of fluid from the first and second pumps 322 and 338 supplies fluid to the power steering motor assembly 12 to turn the steerable vehicle wheels (not shown). When the speed of the engine (not shown) is below the second predetermined speed, as previously defined with reference to the hydraulically assisted steering apparatus or system 10 of FIG. 1, such as when the vehicle is conducting parking and similar maneuvers, the entire flow of fluid from the second pump 338 is directed to the power steering motor assembly 12.

When the speed of the engine (not shown) increases, the pressure drop across the fixed area control orifice 334 increases. The valve spool 350 of the valve 344 moves toward the right, as viewed in FIGS. 5A and 5B, in response to the relatively high pressure drop across the control orifice 334, which at least partially offsets the effect of the return spring 356 on the valve spool 360. As the valve spool 350 moves toward the right, the flow of fluid to the fluid reservoir 326 or the bypass tank 327 of the fluid reservoir increases, and the flow of fluid through the fluid supply conduit 332 to the control valve (not shown) and to the hydraulic power steering motor assembly 12 decreases. Therefore, the flow of fluid from the second pump 338 to the power steering motor assembly 12 decreases when the speed of the engine (not shown) increases. When the speed of the engine (not shown) is at or above the first predetermined speed, as previously defined with reference to the hydraulically assisted steering apparatus or system 10 of FIG. 1, much, but not all, of the flow of fluid from the second pump 338 is directed to the fluid reservoir 326 or the bypass tank 327 of the fluid reservoir.

The first pump 322 has a pumping volume or capacity or is sized so as to provide a fluid flow required by the power steering motor assembly (not shown) to effect a first vehicle maneuver, as previously defined with reference to the hydraulically assisted steering apparatus or system 10 of FIG. 1, when the speed of the engine (not shown) is at or above the first predetermined speed. The second pump 338 has a pumping volume or capacity or is sized so as to provide a fluid flow that, when combined with the fluid flow of the first pump 322, results in a fluid flow to the power steering motor assembly 12 sufficient for the power steering assembly to effect a vehicle parking maneuver when the speed of the engine (not shown) is at or below the second predetermined speed, as previously defined with reference to the hydraulically assisted steering apparatus or system 10 of FIG. 1. As the second predetermined speed of the engine (not shown) will typically be less than the first predetermined speed of the engine and as both the first pump 322 and the second pump 338 are being driven by the engine in the hydraulically assisted steering system 300, both the first pump 322 and the second pump 338 will be delivering lower fluid flows when the engine is operating at or below the second predetermined speed than when the engine is operating at or above the first predetermined speed.

If the vehicle (not shown) is cruising at highway speed and the engine (not shown) is thus at or above the first predetermined speed, there may be a need for vehicle to execute a second vehicle maneuver, as previously defined with reference to the hydraulically assisted steering apparatus or system 10 of FIG. 1, such as, for example, an abrupt collision-avoidance maneuver. The fluid flow required by the power steering motor assembly 12 to effect such a second vehicle maneuver will be greater at any given engine speed at or above the first predetermined speed than the fluid flow required by the power steering motor assembly to effect the first vehicle maneuver, such as a lane maintenance maneuver. The fluid flow required by the power steering motor assembly 12 to effect such a second vehicle maneuver will thus also be greater than the fluid flow that can be delivered by the first pump 322. Some or all of the fluid flow from the second pump 338 will be required to enable the power steering motor assembly 12 to effect the second vehicle maneuver.

In the hydraulically assisted steering apparatus or system 300 of FIGS. 5A and 5B, the fixed area control orifice 334 is designed or sized such that the pressure differential applied to the valve 344 will cause the valve spool 350 to move toward, but not all the way to, its second position when the engine (not shown) is operating at speeds at or above the first predetermined speed. The position of the valve spool 350 will be such as to provide sufficient fluid flow, from the second pump 338 in combination with the fluid flow from the first pump 322, to enable the power steering motor assembly (not shown) to effect the second vehicle maneuver. In other words, at least some of the fluid flow from the second pump 338 will be directed to the power steering motor assembly 12 in response to the pressure differential applied to the valve spool 350 by the control orifice 334 alone.

In order to permit the valve spool 350 to move all the way to or fully into its second position, the pressure differential applied to the valve spool 350 is modified by a solenoid-operated pressure restrictor 354. The pressure restrictor 354 includes a valve spool 364 that is movable in a housing 366 of the pressure restrictor under the influence of a solenoid 368. The valve spool 364 moves between a first position, which is shown in FIG. 5A and in which no fluid flows through the pressure restrictor 354, and a second position, which is shown in FIG. 5B and in which fluid flows through an orifice 370. The pressure restrictor 354 is in fluid communication with a chamber 372 through which the fluid pressure from the downstream side of the control orifice 334 is applied to the right end portion 359 of the valve spool 350. Thus, when the solenoid 368 moves valve spool 364 of the pressure restrictor 354 into its second position, fluid and fluid pressure in the chamber 372 bleeds out through the orifice 370 to the fluid reservoir 326 or the bypass tank 327. The pressure differential being applied to the valve spool 350 of the valve 344 will increase as a result of the reduction of pressure in the chamber 372, and the valve spool 350 may move fully into its second position. As will be apparent from the foregoing, the valve spool 364 of the pressure restrictor 354 is a member that moves from a first position to a second position when the pressure restrictor 354 is operated or actuated to move from its first position to its second position.

The orifice 370 of the pressure restrictor 354 is designed or sized such that the increased pressure differential applied to the valve 344 will cause the valve spool 350 to move all the way to or felly into its second position when the engine (not shown) is operating at speeds at or above the first predetermined speed. When the solenoid 368 moves the valve spool 364 of the pressure restrictor 354 into its second position, ail of the fluid flow from the second pump 333 will be directed to the fluid reservoir 326 or bypass tank 327 and only the fluid flow from the first pump 322 will be directed to the power steering motor assembly 12. By sizing the first pump 322 or constructing the first pump with a pumping volume or capacity so as to provide a fluid flow required by the power steering motor assembly (not shown) to effect a first vehicle maneuver, such as maintaining the vehicle in position in a lane of a roadway, when the speed of the engine (not shown) is at or above the first predetermined speed, the hydraulically assisted steering system 300 will consume less energy than, for example, a steering system that always provides sufficient fluid flow for all potential vehicle maneuvers at or above the first predetermined speed. Such an energy savings will occur so long as all of the fluid flow from the second pump 338 is returned to the fluid reservoir 326 or bypass tank 327. Although the energy saving operation of the hydraulically assisted steering system 300 has been described with reference to when the speed of the engine is at or above the first predetermined speed, the pressure restrictor 354 may also be operated to return all of the fluid flow from the second pump 338 to the fluid reservoir 326 when, for example, the vehicle (not shown) is stopped at a traffic light and the engine is at an idling speed.

As can be seen from the foregoing description, the pressure restrictor 354 operates as a control device to modify the operating flow of fluid and/or the return flow of fluid that would otherwise be directed by the valve 344. More particularly, if the pressure restrictor 354 is in its first position, the valve 344 will determine the operating flow of fluid to the hydraulic power steering motor assembly 12 and the return flow of fluid to the bypass tank 327 of the fluid reservoir 326 in accordance with or based on the pressure differential across the control orifice 334, which is the result of the fluid flow from the fluid output 328 of first pump 322 and, potentially, some or all of the fluid flow from the fluid output 342 of the second pump 338. If the pressure restrictor 354 is then operated or actuated to move the pressure restrictor into a different second position and thereby move the valve spool 364 into its second position, the modified position of the valve spool 364 in the pressure restrictor 354 may change or modify the operating flow of fluid to the hydraulic power steering motor assembly 12 and/or the return flow of fluid to the bypass tank 327 of the fluid reservoir 326.

In order to detect when the second vehicle maneuver is occurring, the hydraulically assisted steering system 300 includes a sensor (not shown), such as a steering wheel turning rate sensor, like the sensor 78 of the hydraulically assisted steering system 10 of FIG. 1, which provides an electrical signal indicative of a rate of turning of the vehicle steering wheel (not shown) at or above a predetermined vehicle steering wheel turning rate. The signal from the sensor (not shown) may be delivered to a controller (not shown), such as a vehicle on-board computer, which is operatively connected electrically with the solenoid 368 of the pressure restrictor 354 and which can operate the orifice restrictor to move the valve spool 350 from its second position to its first position or to any intermediate position. The sensor (not shown) may be any type of sensor that senses a condition indicative of the second vehicle maneuver and therefore is capable of detecting when the second vehicle maneuver is occurring or when the second vehicle maneuver is anticipated. Thus, for example, the sensor (not shown) may detect the angle through which the steering wheel is turned and/or the torque applied to the steering wheel. The sensor may alternatively detect that brakes (not shown) of a vehicle are being applied when the engine is at or above the first predetermined speed, which may be an indicator that the second vehicle maneuver is anticipated or likely to occur.

The sensor (not shown) may also be one of several sensors providing signals to the controller (not shown). In such a situation, the controller may be programmed to use a signal from one or more of the sensors to determine whether and when to operate or actuate the solenoid to move the valve spool 350 from its second position to or toward its first position or de-actuate the solenoid so that the return spring 356 moves the valve spool from its second position to its first position. The use of sensors to detect the position or other conditions of the steering wheel or to sense or detect the conditions of other vehicle components permits the solenoid 368 of the pressure restrictor 354 and thus the valve 344 to be operated or actuated in response to inputs other than steering demand from the steering control valve and, thus, engine speed.

In the embodiments of the invention described above, fluid flow from the second pump 38, 238, 338 or the second pumping volume P2 is described as being directed to a fluid reservoir 26, 226, 326, a bypass tank 227, 327 and/or a fluid inlet portion 142 of the second pumping volume P2. For purposes of the present invention, whether fluid is directed to a reservoir, a bypass tank or an inlet to a pump, the effective result is the same, namely, that the fluid is not directed to a power steering motor assembly. Also, while a particular bypass valve 170 is illustrated in FIG. 3 and described above, the bypass valve of the hydraulically assisted power steering apparatus or system 10 may be any solenoid valve having any construction or any other valve that is operable or actuatable to control flow from the output of the second pump to the steering control valve 18 and the power steering motor assembly 12 and to the fluid reservoir 26.

Also, in the embodiments of the invention described above, the first pump 22, 222, 322 or the first pumping volume P1 is described as having a pumping volume or capacity or is sized so as to provide a fluid flow required by the power steering motor assembly 12 to effect a first vehicle maneuver when the speed of the engine 36 is at or above (in other words, equal to or greater than) a first predetermined speed, which may correspond to the vehicle (not shown) cruising at highway speed, such as, for example, 55 miles per hour. The first predetermined speed need not, however, correspond to the vehicle (not shown) cruising at highway speed. The first vehicle maneuver may involve a steering maneuver to maintain the vehicle in position in a lane of a roadway, as, for example, when the roadway curves or otherwise deviates from a straight line, at an engine speed corresponding to any vehicle speed.

From the above description of the invention, those skilled in the art will perceive applications, improvements, changes and modifications to the present invention. Such applications, improvements, changes and modifications within the skill of the art are intended to be covered by the appended claims.

Having described the invention, the following is claimed:

1. An apparatus for use in turning steerable wheels of a vehicle, said apparatus comprising:
   a power steering motor assembly connected with the steerable vehicle wheels, the power steering motor assembly including a steering control valve and a power steering motor, the steering control valve moving in response to rotation of an input shaft to control fluid flow to and from a first chamber and a second chamber of the power steering motor so as to move a piston of the power steering motor, the steering control valve in response to rotation of the input shaft directing fluid from a fluid inlet of the steering control valve to one of the first and second chambers and away from the other of the first and second chambers;
   a first pump connected in fluid communication with the fluid inlet of the steering control valve and driven by an engine of the vehicle, during operation of the engine, to supply fluid under pressure to the fluid inlet of the steering control valve, the first pump being sized so as to provide a fluid flow required by the power steering motor assembly to effect a first vehicle maneuver when the engine is operating at a speed at or above a first predetermined speed;
   a second pump connected in fluid communication with the fluid inlet of the steering control valve to supply fluid under pressure to the fluid inlet, the second pump being sized so as to provide a fluid flow that when combined with the fluid flow of the first pump results in a fluid flow to the power steering motor assembly sufficient for the power steering motor assembly to effect a second vehicle maneuver when the engine speed is at or above the first predetermined speed;
   a first valve connected in fluid communication with the fluid inlet of the steering control valve and with the second pump, the first valve being operable to direct an operating flow of fluid from the second pump to the fluid inlet of the steering control valve, the first valve also being operable to direct a return flow of fluid from the second pump to a reservoir; and
   a control device including an electrically actuated mechanism that when actuated moves a member from a first position to a second position to modify the operating flow of fluid and/or the return flow of fluid that would otherwise be directed by the first valve,
   the control device being operable such that the operating flow of fluid when modified by the control device and combined with the fluid flow of the first pump results in a combined fluid flow to the power steering motor assembly sufficient for the power steering motor assembly to effect the second vehicle maneuver when the engine speed is at or above the first predetermined speed, the power steering motor assembly requiring a greater fluid flow at any given engine speed at or above the first predetermined speed to effect the second vehicle maneuver than to effect the first vehicle maneuver.

2. An apparatus as set forth in claim 1 wherein the second vehicle maneuver is determined by a vehicle steering wheel turning at a rate above a first predetermined rate.

3. An apparatus as set forth in claim 1 wherein the first valve directs fluid flow from the second pump to the power steering motor assembly in response to a decrease in speed of the engine.

4. An apparatus as set forth in claim 1 wherein the first valve directs fluid flow from the second pump to the power steering motor assembly in response to a decrease in flow from the first pump.

5. An apparatus as set forth in claim 1 wherein the first valve directs fluid flow from the second pump to a reservoir in response to an increase in speed of the engine.

6. An apparatus as set forth in claim 1 wherein the first valve directs fluid flow from the second pump to a reservoir in response to an increase in flow from the first pump.

7. An apparatus as set forth in claim 1 wherein a fixed area control orifice is located in a conduit conducting fluid from the first pump to the power steering motor assembly, a pressure at an upstream side of the fixed area control orifice urges the first valve to decrease the flow of fluid from the second pump to the power steering motor assembly, a pressure at a downstream side of the fixed area control orifice urges the first valve to increase the flow of fluid from the second pump to the power steering motor assembly.

8. An apparatus as set forth in claim 7 wherein a spring urges the first valve to increase the flow of fluid from the second pump to the power steering motor assembly.

9. An apparatus as set forth in claim 7 wherein the conduit conducts fluid from the second pump to the power steering motor assembly, fluid flow from the first pump and the second pump passing through the fixed area control orifice.

10. An apparatus as set forth in claim 9 wherein a conduit directs fluid from the first valve to the upstream side of the fixed area control orifice.

11. An apparatus as set forth in claim 7 wherein the control device includes a second valve operable to reduce the pressure applied to the first valve from the downstream side of the fixed area control orifice.

12. An apparatus as set forth in claim 7 wherein first valve includes a valve spool, the pressure applied to the first valve from the upstream side of the fixed area control orifice and from the downstream side of the fixed area control orifice being applied to opposed surfaces of the valve spool to move the valve spool to a first spool position, the control device being attached to the valve spool and being operable to move the valve spool against one of the applied pressures to a second spool position different from the first spool position.

13. An apparatus as set forth in claim 1 wherein the control device includes a second valve operable to divert fluid flow from the second pump away from the first valve and away from the power steering motor assembly.

14. An apparatus as set forth in claim 1 wherein a pumping mechanism includes a first pumping volume defining the first pump and a second pumping volume defining the second pump, the first pumping volume being smaller than the second pumping volume.

15. An apparatus as set forth in claim 14 wherein the pumping mechanism includes a cam ring having a first generally semicircular portion with a first interior elliptical surface and a second generally semicircular portion with a second interior elliptical surface, the second interior elliptical surface being spaced from a rotor by a larger distance than the first interior elliptical surface is spaced from the rotor.

16. An apparatus as set forth in claim 1 wherein the first and second pumps are mounted on the same shaft.

17. An apparatus as set forth in claim 1 wherein the second pump discharges a greater volume of fluid than the first pump when the first and second pumps are being driven at the same speed.

18. An apparatus as set forth in claim 1 wherein the second pump is driven by the engine of the vehicle.

19. An apparatus as set forth in claim 1 wherein the control device includes a second valve in fluid communication with an outlet of the second pump to and with an inlet of the second pump, the second valve being operable to direct fluid flow from the outlet of the second pump to the inlet of the second pump when the engine speed is at or above the first predetermined speed.

20. An apparatus as set forth in claim 1 further comprising a sensor that senses a condition indicative of the second vehicle maneuver, the control device being operable in response to the sensor sensing the occurrence of the condition indicative of the second vehicle maneuver.

21. An apparatus as set forth in claim 1 wherein the first pump is sized so as to provide a fluid flow required by the power steering motor assembly to effect a first vehicle maneuver when the engine is operating at a speed at or above a first predetermined speed corresponding to the vehicle cruising at highway speed, the second pump being sized so as to provide a fluid flow that when combined with the fluid flow of the first pump results in a fluid flow to the power steering motor assembly sufficient for the power steering motor assembly to affect a vehicle parking maneuver when the engine is operating at a speed at or below a second predetermined speed corresponding to the vehicle conducting parking maneuvers.

* * * * *